United States Patent Office 2,887,621
Patented May 19, 1959

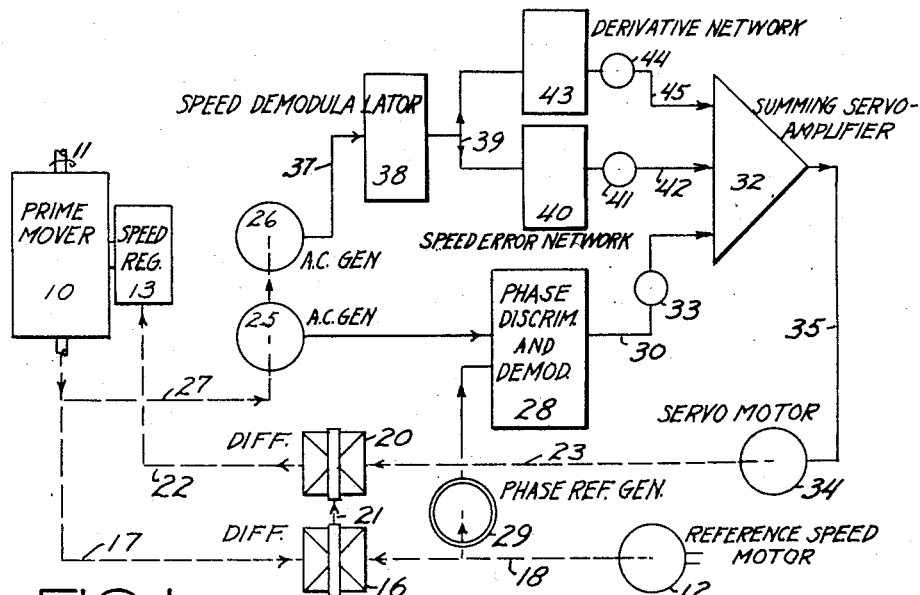

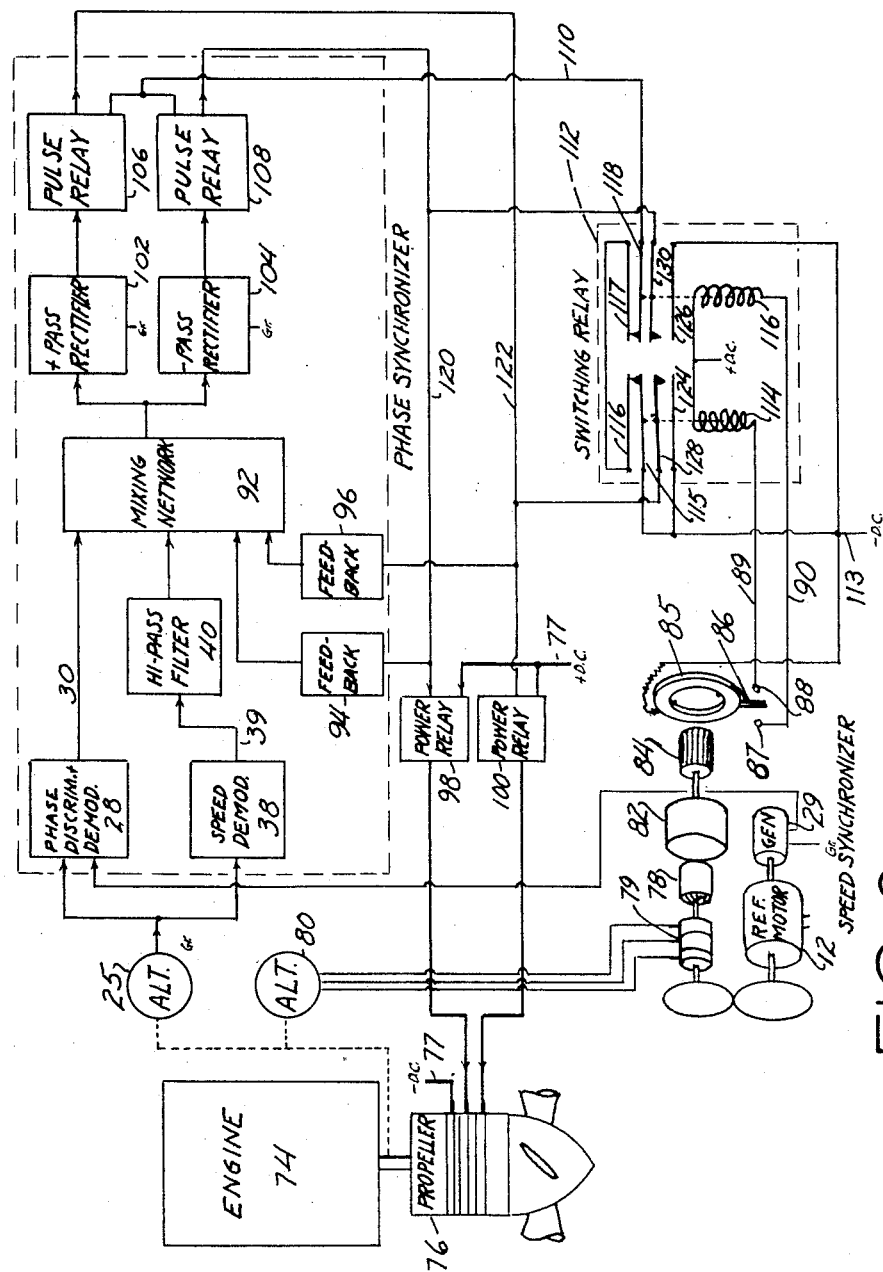

2,887,621

SPEED AND PHASE SYNCHRONIZERS

Arthur E. Wilde, Jr., Morris Plains, N.J., assignor to Curtiss-Wright Corporation, a corporation of Delaware Application January 31, 1956, Serial No. 562,512

10 Claims. (Cl. 317—6)

This invention relates to a system for controlling the speed and phase relation of a prime mover.

Broadly, the system includes reference speed and reference phase devices, means to produce signals representative of actual prime mover speed and phase conditions, and means to compare the actual and reference signals to produce speed error and phase error signals which are applied to a servo mechanism to adjust prime mover speed.

Speed synchronization, as is well known, consists in having the machines or engines run at the same r.p.m., while phase synchronization consists in having reference elements on the shafts of each engine hold substantially the same angular position during operation. Both of these results can be secured by judicious adjustment of the rate and amount of control movement of the speed controllers of the engines. Assuming an engine is to be controlled to constant speed and phase, and is subject to deviations from constancy, there are three quantities which may be sensed and combined to produce a control signal effective to restore the engine to constant speed and phase upon the occurrence of a speed and phase excursion. These are, the acceleration of the excursion, the speed error, and the phase error. An effective system must use forms of these signals which can be used effectively for large as well as small error excursions. As will appear later, the present invention uses two arrangements for securing adequate speed error signals and two for adequate phase error signals.

More particularly, the system includes a speed synchronizer sub-system of great reliability and ruggedness which may, if necessary, operate independently of the phase synchronizing sub-system. The phase synchronizing sub-system operates substantially independently of the speed synchronizer sub-system; the speed corrective signals from the two sub-systems are applied jointly or separately to the speed control servo mechanism. The phase synchronizing sub-system includes not only a phase error deriving network, but also speed error and acceleration stabilizing networks for stabilizing the system and yielding prompt and precise control. Three signals—phase error, speed error and acceleration—are summed algebraically to produce a stabilized signal which actuates the prime mover speed changer when it is off phase, to correct phase error. Objects of the invention are to provide a stable and relatively fail-safe speed and phase control system, sometimes called a synchro-phasing system, for a prime mover of any sort, but particularly for powerplants comprising an engine and controllable pitch aircraft propeller.

A fuller understanding of the invention may be gained by reading the following detailed description in connection with the drawings, in which similar reference characters indicate similar parts and in which:

Fig. 1 is a diagram of a generalized form of the invention,

Fig. 2 is a schematic view of a speed signal producing generator used in Fig. 1, Fig. 3 is a diagram of a demodulator network used in Fig. 1, Fig. 4 is a diagram of a discriminator network used in Fig. 1, Fig. 5 is a diagram of the Fig. 1 invention showing exemplary wave forms and combinations thereof, Fig. 6 is a more extensive diagram of the invention developed for the control of one or more aircraft powerplants incorporating controllable pitch propellers.

The invention in generalized and schematic form is shown in Fig. 1. Herein, a prime mover 10, which may be an engine, motor or other powerplant, has a rotating output shaft 11 to be run at a selected speed and at a selected phase angle with respect to a master speed reference motor 12. The prime mover includes a speed regulator 13 comprising precise means for adjusting the speed and rate of speed increase and decrease of the prime mover. The speed regulator may be a throttle for motive fluid to the prime mover, means to regulate the amount of driven load such as a variable pitch propeller, or means to regulate energy input to the prime mover.

A basic and rugged control for the prime mover speed regulator 13 comprises a differential 16 which compares the speed of the prime mover, through a connection 17, with the speed of the reference speed motor 12, through a connection 18. The speed error from the output of differential 16, if any, is transmitted to a second differential 20 through a connection 21 and a connection 22 leads from the output of the second differential to the prime mover speed regulator 13. This part of the system, which has been applied previously, provides a speed synchronizer having response to both large and small speed errors.

To provide phase synchronization in precise manner, and also to improve the effectiveness of speed synchronization, the differential 20 has a second input 23 which is driven according to phase error and other factors as will be described. The input signal from 23 is added to the signal from 21 in the second differential 20, to insert speed regulation control quantities of amount and direction to bring about phase synchronism of the prime mover with the reference speed motor 12.

The prime mover drives small A.C. generators 25 and 26 through a connection 27. The frequency of these generators is several cycles per prime mover revolution. Generator 25 output leads to a phase discriminator and demodulator 28, which is also supplied with an A.C. input of the same order of frequency as that of generator 25 from a phase reference generator 29, driven by the reference speed motor 12.

The apparatus 28 compares the phase relation of the two A.C. input signals when at the same frequency, demodulates the A.C. carrier frequencies and yields a D.C. output voltage at 30 of magnitude and polarity analogous to a function of the phase error, if any, between the prime mover 10 and the reference motor 12. The output 30 leads to a summing servo-amplifier 32, through a signal strength trimmer 33. The amplifier 32, when operating, provides sufficient power to operate a servo-motor 34 through a power connection 35. Motor 34 drives the input 23 to the second differential 20 to insert phase corrective signals in the prime mover speed regulation.

I find that, to increase system stability and precision, acceleration and speed error signals should be combined with phase error signals. To this end, generator 26 produces an A.C. voltage output proportional to prime mover speed. This output is carried through connections 37 to a demodulator 38 (Fig. 3) whose output at 39 is a D.C. voltage which varies in magnitude as prime mover speed. One branch of output 39 connects to the servo-amplifier 32 through a speed reference network 40, which may comprise a high pass filter or analogous network. This network 40 passes transient or fast-occurring speed changes, but suppresses slow speed drifts. The latter are taken care of in an absolute manner by the speed synchronizing system previously described and involving the reference motor 12 and the differential 16.

Another branch of the output 39 leads to a derivative network 43 which calculates, in terms of voltage variation, the rate of change or first derivative of the input 39, and which thus has an output signal in a lead 45 which is a function of prime mover acceleration and deceleration.

This derivative network is a well-known circuit arrangement, consisting, for example, of a series capacitor and means to match impedances of the power source and load. The lead 45 is connected through a signal strength trimmer 44 to the servo-amplifier 32.

Also, the output lead 42 from the speed error network includes a signal strength trimmer 41. The servo-amplifier 32 sums, algebraically, the input signals from leads 30, 42 and 45. Relative strengths of these signals are trimmed or proportioned by devices 33, 41 and 44 to yield a power input to the servo-motor 34 which is in consonance with stabilization and sensitivity requirements to give optimum control characteristics for prime mover speed regulation.

The generators 25 and 26 (Fig. 2) may be within the same housing and are small simple units since the power required of them is small. The generator 29 is of the same type as 25 and 26, except that the stator is preferably adjustable rotationally to set a desired phase reference angle. Alternatively, the generator 29 may be fixed, and the generator 25 may be adjustable to enable control of the phase position of the prime mover relative to the reference motor 12. Fig. 2 shows an exemplary arrangement for these generators, wherein a rotor 48 carries a multi-pole permanent magnet 49. A number of pick-up windings 50 are arranged on a core around the magnet. The differentials 16 and 20 may be conventional spur or bevel gear differentials, or may be electro-mechanical as later shown, or of other mechanical or electrical type.

The speed demodulator 38 is a known type of device; it is essentially a rectifier assembly as shown in Fig. 3. The phase discriminator and demodulator 28 comprises a rectifier network 51 and transformers 52 and 53 as shown in Fig. 4. The two inputs are combined in the rectifier network, output being taken from center taps on the transformer secondaries. Trimming devices 33, 41 and 44 may comprise potentiometers.

As mentioned, the arrangement of Fig. 1 is generalized. In a preferred arrangement, it is desirable to incorporate additional filtering and amplification to secure desired signal strength, to minimize undesired ripples and stray frequencies, and to isolate operating frequency bands by additional filtration. Also, for remote disposition of some synchronizer components from prime-mover and related equipment, electrical transmission of signals may be desirable. These features, along with others to be described, are shown in Fig. 6.

Fig. 5 shows exemplary wave forms and their combination, typical of a small demand for speed increase effected by increasing the speed of the reference motor 12. Output 56 of phase generator 29 shows a small increase in carrier frequency and an increase in the carrier envelope amplitude, due to the called-for speed increase. Lagging the increase of 56, waves 58 show a corresponding engine speed increase, brought about by the operation of reference motor 12 and differential 16. Wave 58 is demodulated by 38 to a D.C. voltage, showing an increase corresponding to the increased amplitude of wave 58. Network 40 converts wave 58 to a speed error pulse 60 applied to the summing amplifier 32.

Network 43 differentiates speed change, producing positive and then negative acceleration pulses 62 occurring during the speed change.

The phase discriminator and demodulator 28 combine the waves 56 and 58 (the latter lagging the former) producing one or more cycles 64 showing phase slip between reference motor 12 and prime mover 10 as the speed transient occurs and as the prime mover comes on-speed. The last loop 66 of this wave shows attenuation as phase error gradually dies out, upon correction thereof. The summation of the three waves 60, 62 and 64, is shown at 68, the output of the summing servo-amplifier 32, this wave 68 comprising the corrective signal applied to the differential 20. Action of the latter modifies the rate of speed correction of the prime mover 10, to bring the prime mover on-speed and on-phase with the reference motor 12.

These wave forms are typical of only one type of correction, and vary with different kinds and degrees of correction. In many instances, there may be no phase slip between the prime mover and the phase reference generator.

In Fig. 6 the invention is shown as applied to an aircraft powerplant comprising an engine 74 driving a controllable pitch propeller 76. The latter may be of any suitable type, such, for example, as that shown in Patent #1,951,320, wherein electrical power, furnished from a power source 77, is switched selectively to an electrical motor geared to the propeller blades to increase or decrease propeller pitch.

Also shown in Fig. 6 is part of a multi-powerplant speed synchronizer according to Patent #2,433,432, including the reference speed or master motor 12, and a three-phase armature 78 supplied through slip rings 79 from an engine driven alternator 80. The armature is rotationally driven at a selected speed by motor 12; the electrical field rotates oppositely. When the engine 74 and motor 12 are synchronized, the electrical field stands still; if there is an offspeed, the electrical field rotates in a direction according to the speed error. The armature 78 is embraced by a drag cup 82 which stands still or rotates with the electrical field of armature 78. The drag cup and armature, for convenience, are shown separated. The drag cup drives a switching rotor 84, resembling a commutator in construction, but the commutator bars are cross-connected. The rotor 84 is engaged by brushes of an oscillatory switch ring 85 which enables proportional energization of the propeller pitch changing motor according to offspeed.

The switch ring 85 carries brushes engaging the switch bars 84, and has a switch arm 86. The arm 86 may engage one or the other of the fixed contacts 87 or 88 which are respectively connected to a pitch increase lead 89 and a pitch decrease lead 90. Rotation of the drag cup 82 causes switch 86 to close on one or the other of contacts 87 or 88 and causes the synchronizer to operate in accordance with said Patent #2,433,432.

In effect, the elements 78 and 82 comprise an electro-mechanical differential equivalent to differential 16 in Fig. 1. The controllable propeller 76 comprises a variable engine load by which engine and propeller speed are controllable within narrow limits, this part of the system being broadly equivalent to the speed regulator 13 of Fig. 1.

In the upper part of Fig. 6, the phase synchronizer electrical system is shown in modified form and some components bear the same reference characters as do similar components in Fig. 1.

The demodulating phase discriminator 28 feeds its D.C. phase error signal to a mixing network 92. The speed demodulator feeds its D.C. signal 39 equivalent to speed through the highpass filter 40, and thence to the mixing network 92, low-order speed drifts are filtered out, leaving higher speed change transients. The mixing network 92 also receives negative feedback signals from feedback networks 94 and 96, in turn energized by actuation of power relays 98 and 100 by operation of the phase synchronizer. These feedback networks yield an output representing acceleration characteristics of the system when pitch change is called for, and incorporate time-delay components to represent the time lag characteristics, not only of the propeller pitch changing mechanism, but also of the engine-propeller combination.

As will be seen, the feedback networks 94 and 96 are energized and de-energized in response to operation of the phase synchronizer assembly, and also, but to no effective avail, in response to operation of the speed synchronizer.

The mixing network 92 algebraically adds the several D.C. input signals and produces a D.C. output which is variable between positive and negative polarity like the signal 68 in Fig. 5. The output of the mixing network 92 is connected to a positive pass rectifier 102 and to a negative-pass rectifier 104. When a positive signal issues from network 92, it is passed by rectifier 102 to energize a pulsing relay 106, the output of which drives the power relay 100. In like fashion, when a negative signal issues from network 92, it is passed by rectifier 104 to energize a pulsing relay 108, the output of which drives the power relay 98. Both pulsing relays 106 and 108 are arranged to produce servo power pulses of fixed duration at a variable frequency depending on the duration and magnitude of the D.C. signal input thereto from the associated rectifiers 102 and 104 respectively. This is the same as producing servo power pulses proportional to the phase error of the powerplant as stabilized by the speed and acceleration corrections.

The pulsing relays 106 and 108 are constrained to operate only when the powerplant is on-speed as controlled by the speed synchronizer. To this end, servo power to the pulsing relays is derived through a lead 110 from a switching relay 112. This relay comprises solenoids 114 and 116 respectively energized by closure of the switch arm 86 of the speed synchronizer on contacts 88 or 87. The relay 112 in its unenergized condition, as shown, connects power from servo power lead 113 through relay switch arms 115, 116, 117 and 118 to the lead 110, allowing the phase synchronizer to operate. This lead 110 carries servo power to pulse relays 106 and 108; when the pulse relays are activated by the signals thereto, servo power is lead to the power relays 98 and 100, through servo leads 120 and 122. When leads 120 or 122 are energized, the feedback networks 94 or 96 are energized, respectively, providing stabilization, as previously mentioned, for the phase synchronizer.

The switching relay 112, upon action of the speed synchronizer, disconnects servo power from the pulsing relays of the phase synchronizer. This provides a priority system, wherein speed synchronization demands always take priority over phase synchronization demands. When either solenoid 114 or 116 is energized by action of the ring 85 and the contacts 86, 87 and 88, switch arms 115 or 118 are moved by relevant solenoids, breaking the servo power supply to the lead 110. The switching relay comprises switch arms 124 and 126 connected to the servo power lead 113. A movable switch arm 128, coupled to the arm 115, closes on the arm 124 when solenoid 114 is energized, connecting servo power to the power relay 100, providing propeller pitch changing power to the propeller for r.p.m. correction in one direction. In similar fashion, a movable switch arm 130 is coupled to arm 118 and closes on arm 126 when solenoid 116 is energized, connecting servo power to the power relay 98, providing propeller pitch changing power to the propeller for r.p.m. correction in the other direction.

The arrangement of Fig. 6 differs from that of Fig. 1 primarily by the priority system above described and afforded by the switch relay 112. Speed corrections occur independently of phase correcting signals, and phase corrections occur independently of speed correction, after speed correction has been attained and when the speed correcting system is satisfied and at rest. In the Fig. 1 arrangement, speed and phase correcting signals are superimposed and act at the same time. While the Fig. 1 arrangement is satisfactory, the Fig. 6 arrangement is preferred. At times, the Fig. 1 system may produce opposed speed and phase correcting signals which may require a longer time for the system to reach an on-speed, on-phase condition than is the case when the priority system of Fig. 6 is utilized.

Both the Fig. 1 and Fig. 6 systems have the feature that the speed synchronizer, as a primary type control, may always operate regardless of possible failure of the phase synchronizing system.

Various modifications within the scope of the invention are possible in the networks included in the acceleration, speed error, feedback, and phase error legs of the system. It is to be understood that the practice of the invention can include such changes and modifications as may come within the skill of the circuit designer. Likewise, the particular arrangement of generators may be modified. For instance, both demodulators 28 and 38 may be supplied from the same generator, the circuits including suitable isolation devices to avoid interaction between the demodulators.

In the arrangements shown, the phase reference generator 29, driven by the reference speed motor 12, may be marked with a phase index. Depending upon the number of poles on the phase reference generator and on generator 25, phase matching of one blade in particular of the propeller with the phase reference generator may be secured. Alternatively, any blade of the propeller may be phased with the phase reference generator. In a multi-powerplant installation, a single reference speed motor is preferable for all of the controls, and power take-offs may be used for the speed control systems for other powerplants. The system may also be modified so that the reference speed motor 12 may be replaced by one of the powerplants, which acts as a master to which other powerplants are slaved.

While I have described my invention with respect to two embodiments, it is to be understood that various modifications may be made in the invention without departing from the spirit or scope thereof. Reference should be had to the following claims for definitions of the limits of the invention.

I claim:

1. A synchronizing and synchrophasing system for a powerplant having a rotor operable at various speeds and having a speed controller, comprising in combination, a reference speed motor, means connected to the rotor and said motor to compare the speeds thereof having a speed error output element, a coordinating device having an output element connected to operate said speed controller and two input elements one connected to and actuated by said speed error output element, a phase reference device driven by said motor, means connected to said phase reference device and rotor to compare the phase relation thereof productive of a phase error signal, summing means having as one input said phase error signal and an output driving the other input of said coordinating device, means to derive a speed change signal from said rotor, said speed change signal comprising another input to said summing means.

2. A system according to claim 1, wherein said coordinating device comprises priority switching means connecting said speed error output element to the coordinating device output upon existence of a speed error, and at other times connecting said phase error signal to the coordinating device output.

3. A synchronizing and synchrophasing system for a powerplant having a rotor operable at various speeds and having a speed controller, comprising in combination, a reference speed motor, means connected to the rotor and said motor to compare the speeds thereof having a speed error output element, a coordinating device having an output element connected to operate said speed controller and two input elements one connected to and actuated by said speed error output element, a phase reference device driven by said motor, means connected to said device and rotor to compare the phase relation thereof productive of a phase error signal, summing means having as one input said phase error signal, an output driving the other input of said coordinating device, means to derive a speed change signal from said rotor, said speed change signal comprising another input to said summing means, and means to derive a rate of speed change signal from said rotor, said rate of speed change signal comprising another input to said summing means.

4. A synchronizing and synchrophasing system for a powerplant having a rotor operable at various speeds and having a speed controller, comprising in combination a reference speed motor, means connected to the rotor and to said motor to compare the speeds thereof having a speed error output element, a coordinating device having an output element connected to operate said speed controller and two input elements one connected to and actuated by said speed error output element, a phase reference device driven by said motor, means connected to said device and rotor to compare the phase relation thereof productive of a phase error signal, summing means having as one input said phase error signal and an output driving the other input of said coordinating device, and means to derive a rate of speed change signal from operation of said speed controller, said rate of speed change signal comprising another input to said summing means.

5. A system according to claim 4 wherein said coordinating device comprises a differential.

6. A system according to claim 4 wherein said coordinating device comprises switch means normally connecting said output element to said summing means, and alternately connecting said output means to said speed error element during existence of a speed error.

7. A system according to claim 4 including pulsing means driven by said summing means to make phase error signals intermittent.

8. A synchronizing and synchrophasing system for a powerplant having a rotor operable at various speeds and having a speed controller, said rotor having a speed synchronizing system for sensing speed errors and operable to actuate said speed controller upon the existence of speed errors, a phase reference generator, a generator driven by said rotor providing output in consonance with the existing phase of the rotor, means driven by said generators producing a phase error signal, pulsing means connected to said driven means and responsive to a phase error signal to produce pulses proportional to signal magnitude, a switching device normally connecting said pulsing means to said speed controller to transmit pulses thereto, and said switching device including an element driven by said speed synchronizer and responsive to speed error signals therefrom to disconnect said pulsing means from said speed controller and to connect said speed synchronizer to said speed controller.

9. A system according to claim 8 including means to produce a signal indicative of engine speed, means to produce a signal indicative of rate of speed change, and means to sum said two signals with said phase error signal for input to said pulsing means.

10. A synchronizing and synchrophasing system for a powerplant having a rotor operable at various speeds and having a speed controller, comprising in combination, a reference speed motor, means connected to the rotor and said motor to compare the speeds thereof having a speed error output element, a phase reference device driven by said motor, means connected to the device and rotor to compare the phase relation thereof and productive of a phase error signal, a coordinating device including an output element connected to said controller and two input elements, one connected to said speed comparing means output element and additional means to sense powerplant rotor speed change, means actuated by the additional means producing a signal representative of rotor rate of speed change, and a summing means fed by said latter signal and by said phase error signal, said summing means having an output element connected to the other input element of said coordinating device.

References Cited in the file of this patent

UNITED STATES PATENTS

| | | |
|---|---|---|
| 2,517,703 | Offner | Aug. 8, 1950 |
| 2,747,141 | Hine | May 22, 1956 |